United States Patent [19]

Bolick, II et al.

[11] Patent Number: 5,006,327

[45] Date of Patent: Apr. 9, 1991

[54] ALKALI METAL HYDROSULFITE SOLUTIONS

[75] Inventors: Roger E. Bolick, II, Chattanooga; Jimmy M. French, Charleston, both of Tenn.

[73] Assignee: Olin Corporation, Cheshire, Conn.

[21] Appl. No.: 380,923

[22] Filed: Jul. 18, 1989

[51] Int. Cl.$^5$ .................... C01B 17/66; B01D 19/00; C09K 3/00

[52] U.S. Cl. ................................ 423/515; 252/188.22

[58] Field of Search .............. 423/515, 516; 252/188, 252/20, 188, 21, 188, 22, 188, 23

[56] References Cited

U.S. PATENT DOCUMENTS

| | | | |
|---|---|---|---|
| 2,226,576 | 12/1940 | Park et al. | 423/515 |
| 3,298,796 | 1/1967 | Van Damme-van Weele et al. | 23/302 |
| 3,773,679 | 11/1973 | Kise et al. | 423/515 |
| 3,804,944 | 4/1974 | Kise et al. | 423/515 |
| 4,042,675 | 8/1977 | Yamamoto et al. | 423/515 |
| 4,100,098 | 6/1978 | Magan | 423/515 |
| 4,102,803 | 7/1978 | Fujishima et al. | 423/515 |
| 4,126,716 | 11/1978 | Yamamoto et al. | 423/515 |
| 4,283,303 | 8/1981 | Ellis | 423/515 |
| 4,590,058 | 5/1986 | Cawlfield | 423/515 |
| 4,676,961 | 1/1987 | Appl et al. | 423/515 |
| 4,729,886 | 3/1988 | Little et al. | 423/575 |

FOREIGN PATENT DOCUMENTS 1069672 1/1980 Canada .

OTHER PUBLICATIONS

"Transactions of the Tech. Sect., Pulp and Paper Science 8 (3), 60-64 (1982)".

*Primary Examiner*—Gary P. Straub
*Attorney, Agent, or Firm*—James B. Haglind; Paul Weinstein

[57] ABSTRACT

An aqueous solution comprising alkali metal hydrosulfite and hydroxide ions in an amount to provide a residual alkalinity of at least 0.25 moles per liter results in the decomposition of thiosulfate ions present and inhibits their formation during storage. These solutions can be used, for example, in the bleaching of mechanical pulp.

8 Claims, No Drawings

ALKALI METAL HYDROSULFITE SOLUTIONS

This invention relates to alkali metal hydrosulfite solutions. More specifically, this invention relates to alkali metal hydrosulfite solutions containing reduced amounts of undesirable impurities.

Alkali metal hydrosulfites are commercially available bleaching agents which are particularly suitable for use in the pulp, textile, and clay industries.

While available in the anhydrous form, they are advantageously used as a solution. Industrial processes which produce solutions of alkali metal hydrosulfites for bleaching applications also form, as an undesirable impurity, an alkali metal thiosulfate. In the bleaching of mechanical pulps concern over corrosion of stainless steels, specifically the 304 family, has led to the identification of sodium thiosulfate as a contributor. To protect their substantial investment, most mechanical pulp mills with 304SS equipment have devoted considerable effort to reducing thiosulfate concentrations. One of the sources of thiosulfate for a mechanical mill is the sodium hydrosulfite used to bleach the pulp. For example, as reported by A. M. Devaney et al in "Transactions of the Tech. Sect., Pulp and Paper Science 8, (3), 60-64 (1982), it is important to maintain the thiosulfate ion concentration in hydrosulfite solutions used in mechanical pulp bleaching processes suitably below about 4% of the alkali metal hydrosulfite concentration. Therefore it is economically important to reduce the thiosulfate concentration of alkali metal hydrosulfite solutions used in bleaching applications to insignificant levels.

It is known to add alkaline compounds such as sodium hydroxide or potassium hydroxide to stabilize solutions of sodium dithionite during storage. For example, U.S. Pat. No. 3,773,679, issued Nov. 23, 1973 to M. A. Kise and L. C. Ellis, teaches that the pH of aqueous solutions of sodium hydrosulfite is maintained in the range of 5.0 to 8.0 by the addition of small amounts of sodium hydroxide. They further teach in U.S. Pat. No. 3,804,944 the stabilization of sodium hydrosulfite solutions during storage by the careful control of the pH between 9 and 13 by the addition of caustic soda. The process employs residual amounts of up to 0.1 moles per liter of caustic soda. In addition, they teach that large excesses of alkali are detrimental to the sodium hydrosulfite solutions.

U.S. Pat. No. 4,100,098, issued July 11, 1978 to P. R. Magan stabilizes concentrated aqueous solutions containing greater than 13% by weight of sodium hydrosulfite with potassium hydroxide in amounts which provide a residual of KOH of from 1 to 12 grams per liter, or up to about 0.21 moles per liter of hydroxide ion.

The aqueous solutions of sodium hydrosulfite of the prior art have thus been stabilized by the addition of low concentrations of alkaline compounds and the concentration of thiosulfate as an impurity is at least that which was initially present in the solution.

Where, however, these stabilized solutions have concentrations of impurities such as thiosulfate which are in excess of those permitted, for example, in the bleaching of mechanical pulp, it is necessary to reduce the concentration of thiosulfate to acceptable levels.

Various methods of removing thiosulfate ions from alkali metal hydrosulfite solutions have been employed including crystallization processes in which the alkali metal hydrosulfite in the form, for example, of dihydrate crystals is separated from a liquor containing the alkali metal thiosulfate as exemplified by U.S. Pat. No 3,298,796, published Jan. 17, 1967 to M. A. van Damme-van Weele et al; or U.S. Pat. No. 4,590,058 issued May 20, 1986 to D. W. Cawlfield.

These processes, however, require additional process steps and equipment and significantly increase the production cost.

Surprisingly it has been found that the thiosulfate ion is readily reduced in an aqueous alkali metal hydrosulfite solution containing a residual alkalinity of at least about 0.25 moles per liter of hydroxide ion.

Contrary to the teachings of the prior art, alkali metal hydrosulfite solutions having high residual alkalinity concentrations, for example as hydroxide ions, readily decompose the thiosulfate ions present and reduce the concentrations to levels acceptable for the bleaching of mechanical pulp.

The novel solutions of the present invention containing at least about 0.25 moles per liter of hydroxide ion may use as the source of hydroxide ion alkali metal hydroxides such as sodium hydroxide, potassium hydroxide or lithium hydroxide; alkaline earth metal hydroxides including calcium hydroxide or magnesium hydroxide, or mixtures thereof. In addition alkaline compounds which produce hydroxide ions upon addition to alkali metal hydrosulfite solutions may be used.

The solutions are prepared by the addition of the hydroxide source to the hydrosulfite solution by any suitable means. To avoid the dilution of the hydrosulfite solution, hydroxide sources in concentrated forms, including solid forms can be used. For ease of mixing, it is preferred to use aqueous solutions containing at least 30 percent by weight of the hydroxide source.

The decomposition of the thiosulfate ion in the novel solutions of the present invention is accomplished at any temperature including ambient temperatures or the the temperatures of the solution used in the processes of manufacture. However, it has been discovered that the rate of decomposition is increased as the temperature of the solution increases and elevated temperatures may be used if desired.

The reaction time for the thiosulfate ion decomposition reaction varies for example, with the initial thiosulfate ion concentration, the temperature of the solution and the molar concentrations of the hydroxide ion, among others. Following the decomposition reaction, the thiosulfate ion concentration is suitably below about 4% of the alkali metal hydrosulfite concentration in the solution. The solution is then cooled to a temperature of from about 0° to about 15° C., and preferably from about 0° to about 7° C. At these temperatures the rate of decomposition of sodium dithionite in the solution during storage is minimized.

Thiosulfate ion concentrations may be substantially reduced or its formation suppressed in alkali metal hydrosulfite solutions produced by any commercially available process by providing alkaline residuals of at least 0.25 moles per liter of hydroxide ion. The residual hydroxide ion concentration above 0.25 moles per liter may be any amount which avoids the formation of substantial amounts of hydrosulfite crystals. While concentrations greater than about 4 moles per liter of hydroxide may be present, there is no advantage obtained. Preferably the concentration of hydroxide ion is in the range of from about 0.3 moles to about 3 moles per liter, more preferably from about 0.35 to about 2 moles per liter, and most preferably at from about 0.4 to about 1 mole per liter of hydroxide ion. While the pH of these solutions is above 13, the high concentrations of residual alkalinity employed provide the solutions of the present invention with hydroxide ion concentrations which can not be adequately described by a pH designation.

The residual alkalinity is preferably provided by the addition of an alkali metal hydroxide.

In an alternate embodiment, it has been found that the inclusion of additive amounts of lithium ion in the hydrosulfite solutions in which the residual alkalinity is provided by other alkali metal hydroxides or the alkaline earth metal hydroxides effectively enhances the decomposition of thiosulfate ions. Additive amounts include, for example, those in the range of from about 0.02 to about 0.5 moles per liter. Lithium salts suitable for providing additive amounts of lithium, in addition to lithium hydroxide, are lithium halides such as lithium chloride or lithium bromide, lithium carbonate, lithium sulfite and lithium hydrosulfite.

To further illustrate the invention the following examples are presented without any intention of being limited thereby.

EXAMPLE 1

Sodium hydroxide, as prilled anhydrous NaOH, was added to a sodium hydrosulfite solution containing 137.6 grams per liter of $Na_2S_2O_4$ to provide an initial residual alkalinity of 0.36 mole of hydroxide ion per liter (m/l). The solution was placed in a constant temperature bath at 30 degrees C. for six hours, after which it was stored at 8 degrees C. The composition of the sample was monitored periodically for hydrosulfite concentration, thiosulfate ($Na_2S_2O_3$) concentration, sulfite ($Na_2SO_3$) concentration and residual alkalinity. The results were as follows:

| DAYS | $Na_2S_2O_4$ (g/l) | $Na_2S_2O_3$ (g/l) | $Na_2SO_3$ (g/l) | RESIDUAL ALKALINITY (m/l $OH^-$) |
| --- | --- | --- | --- | --- |
| 0 | 137.6 | 2.00 | 17.5 | 0.36 |
| 0.25 | 138.3 | 1.24 | 19.2 | 0.36 |
| 2 | 131.7 | 0.60 | 19.7 | 0.34 |
| 4 | 131.5 | 0.16 | 19.6 | 0.34 |
| 6 | 130.4 | 0.042 | 20.4 | 0.34 |
| 8 | 130.8 | <0.025 | 23.7 | 0.31 |
| 10 | 127.4 | 0.026 | 22.3 | 0.32 |
| 12 | 129.5 | 0.027 | 23.8 | 0.32 |
| 14 | 127.7 | 0.021 | 25.0 | 0.31 |

EXAMPLE 2

The procedure of EXAMPLE 1 was repeated with the addition of prilled sodium hydroxide to provide an initial residual alkalinity of 1 mole per liter. The solution was placed in a constant temperature bath at 30 degrees C. for the entire time period. The results were as follows:

| HOURS | $Na_2S_2O_4$ (g/l) | $Na_2S_2O_3$ (g/l) | $Na_2SO_3$ (g/l) | RESIDUAL ALKALINITY (m/l $OH^-$) |
| --- | --- | --- | --- | --- |
| 0 | 135 | 4.8 | 54 | 1.0 |
| 5 | 131 | 3.2 | 62 | 0.95 |
| 24 | 116 | 0.65 | 85 | 0.80 |

EXAMPLE 3

Using the procedure of EXAMPLE 2, 0.66 g. of $LiOH \cdot H_2O$ and 9 g. anhydrous NaOH were added to a sodium hydrosulfite solution containing 134 grams per liter of $Na_2S_2O_4$ to provide an initial residual alkalinity of 1.05 moles per liter of hydroxide ion. The results were as follows:

| HOURS | $Na_2S_2O_4$ (g/l) | $Na_2S_2O_3$ (g/l) | $Na_2SO_3$ (g/l) | RESIDUAL ALKALINITY (m/l $OH^-$) |
| --- | --- | --- | --- | --- |
| 0 | 134 | 5.3 | 55 | 1.05 |
| 5 | 128 | 3.0 | 64 | 0.975 |
| 24 | 115 | <0.10 | 90 | 0.825 |

EXAMPLE 4

The procedure of EXAMPLE 2 was repeated with a sodium hydrosulfite solution containing 135 grams per liter of $Na_2S_2O_4$ and 1.9 grams of thiosulfate. The results were as follows:

| HOURS | $Na_2S_2O_4$ (g/l) | $Na_2S_2O_3$ (g/l) | $Na_2SO_3$ (g/l) | RESIDUAL ALKALINITY (m/l $OH^-$) |
| --- | --- | --- | --- | --- |
| 0 | 135 | 1.9 | 5 | 1.0 |
| 5 | 133 | <0.1 | 22 | 1.0 |

EXAMPLE 5

The procedure of Example 3 employing 0.66 g $Li(OH)_2$ and NaOH was repeated. The results were as follows:

| HOURS | HYDROSULFITE (g/l) | THIOSULFATE (g/l) | SULFITE (g/l) | RESIDUAL ALKALINITY (g/l NaOH) |
| --- | --- | --- | --- | --- |
| 0 | 134 | 1.9 | 19 | 1.0 |
| 5 | 133 | <0.1 | 24 | 1.0 |

What is claimed is:

1. An aqueous solution comprising sodium hydrosulfite or potassium hydrosulfite, hydroxide ions in an amount to provide a residual alkalinity of at least 0.25 moles per liter and containing from about 0.02 to about 0.5 moles per liter of lithium ions.

2. The aqueous solution of claim 1 in which the lithium ions are provided by a lithium salt selected from the group consisting of a halide, carbonate, sulfite, or hydrosulfite.

3. The aqueous solution of claim 2 in which the hydrosulfite is sodium hydrosulfite.

4. The aqueous solution of claim 3 in which the source of hydroxide ions is sodium hydroxide or potassium hydroxide.

5. A process for treating an aqueous solution of sodium hydrosulfite or potassium hydrosulfite containing thiosulfate ions which comprises admixing a source of hydroxide ions to provide a residual alkalinity of at least 0.25 moles per liter and from about 0.02 to about 0.5 moles per liter of lithium ion.

6. The process of claim 5 in which the lithium ion is provided by a lithium salt selected from the group consisting of a halide, carbonate, sulfite, or hydrosulfite.

7. The process of claim 5 in which the aqueous solution is sodium hydrosulfite.

8. The process of claim 7 in which the source of hydroxide ions is sodium hydroxide or potassium hydroxide.

* * * * *